US012607950B2

(12) United States Patent
Adachi et al.

(10) Patent No.: US 12,607,950 B2
(45) Date of Patent: Apr. 21, 2026

(54) TONER

(71) Applicant: CANON KABUSHIKI KAISHA, Tokyo (JP)

(72) Inventors: Keisuke Adachi, Tokyo (JP); Shintaro Noji, Shizuoka (JP); Kenji Ookubo, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 447 days.

(21) Appl. No.: 18/321,312

(22) Filed: May 22, 2023

(65) Prior Publication Data

US 2023/0384702 A1 Nov. 30, 2023

(30) Foreign Application Priority Data

May 31, 2022 (JP) ................................ 2022-088586

(51) Int. Cl.
*G03G 9/093* (2006.01)
*G03G 9/08* (2006.01)
*G03G 9/097* (2006.01)

(52) U.S. Cl.
CPC ....... *G03G 9/09328* (2013.01); *G03G 9/0821* (2013.01); *G03G 9/09733* (2013.01)

(58) Field of Classification Search
CPC ............. G03G 9/09328; G03G 9/0821; G03G 9/09733; G03G 9/093
See application file for complete search history.

(56) References Cited

U.S. PATENT DOCUMENTS 9,158,216 B2 10/2015 Shimano
9,377,705 B2 6/2016 Shimano
9,383,668 B2 7/2016 Noji
9,500,972 B2 11/2016 Tanaka
9,575,424 B2 2/2017 Nakagawa
9,599,919 B2 3/2017 Isono
9,829,816 B2 11/2017 Tanaka
9,835,964 B2 12/2017 Yoshida
11,397,386 B2 7/2022 Kyuushima
2013/0244157 A1* 9/2013 Inoue et al. ............. G03G 9/00
2014/0186760 A1 7/2014 Kawaguchi
2016/0011534 A1 1/2016 Sano
2016/0282739 A1* 9/2016 Yoshida et al. .......... G03G 9/00
2018/0329328 A1 11/2018 Tanaka
2021/0311405 A1 10/2021 Shiotari
2022/0146953 A1 5/2022 Kyuushima
2022/0155700 A1* 5/2022 Seino et al. ........... G03G 9/093
2022/0373906 A1 11/2022 Ohmori
2022/0373916 A1 11/2022 Adachi

FOREIGN PATENT DOCUMENTS

JP H07181722 A 7/1995
JP 2014-130242 A 7/2014
JP 2014209188 A 11/2014
JP 2018159883 A 10/2018
JP 2019-56897 A 4/2019

* cited by examiner

*Primary Examiner* — Peter L Vajda
*Assistant Examiner* — Grant Steven Seiler
(74) *Attorney, Agent, or Firm* — VENABLE LLP

(57) ABSTRACT

A toner comprising a toner particle comprising a toner core particle and a shell covering the toner core particle, wherein the shell comprises an organosilicon polymer, the shell encapsulates a domain of a release agent, and in cross-sectional observation of the toner particle by a transmission electron microscope, a ratio of domains of the release agent that are not in contact with the toner core particle to a total number of the observed domains of the release agent is 85% by number or more.

8 Claims, No Drawings

TONER

BACKGROUND OF THE INVENTION

Field of the Invention

The present disclosure relates to a toner for developing electrostatic charge images (electrostatic latent images) used in image forming methods such as electrophotography and electrostatic printing.

Description of the Related Art

In recent years, image forming apparatuses such as copiers, printers, and facsimiles have been required to have a longer service life, and in order to meet these demands, toners have also been required to have improved long-term durability. However, deformation of the toners accompanying long-term durability reduces the flowability thereof, resulting in contamination of members such as fusion to a developing member. Therefore, there is a demand for a toner that is resistant to deformation even in long-term durability.

Conventionally, from the viewpoint of long-term durability of a toner, a toner with a core-shell structure in which the toner surface is covered with a high-strength resin has been proposed. For example, Japanese Patent Application Publication No. 2014-130242 proposes a toner having a shell composed of an organosilicon polymer.

Meanwhile, Japanese Patent Application Publication No. 2019-056897 proposes a toner having a shell and achieving both durability and low-temperature fixability. In a toner disclosed in Japanese Patent Application Publication No. 2019-056897, a toner particle is proposed in which a shell is formed after a thermoplastic resin domain is attached to a core. Since the thermoplastic resin domain is in contact with the core, the thermoplastic resin domain acts as a plasticizer for the core during fixing, achieving both high durability and low-temperature fixability.

SUMMARY OF THE INVENTION

Organosilicon polymers such as those disclosed in Japanese Patent Application Publication No. 2014-130242 form a strong three-dimensional crosslinked structure due to siloxane bonds with high binding energy, so the shell has high strength. Therefore, by covering the toner surface with the organosilicon polymer, deformation of the toner is suppressed and contamination of the member is resolved. However, since the toner particle is covered with a strong shell derived from the organosilicon polymer, fixing performance and releasability deteriorate.

Furthermore, in a toner having a high-strength shell as described in Japanese Patent Application Publication No. 2014-130242 and Japanese Patent Application Publication No. 2019-056897, release agent outmigration from the core during fixing is hindered by the shell during low-temperature fixing, so that releasability is lowered. Therefore, a sufficient release effect cannot be obtained, and there is still room for improvement in releasability. In addition, lowering the glass transition temperature (Tg) of the core particle is an exemplary means for achieving low-temperature fixability, but where a high-strength shell is present, the release agent is still unlikely to migrate out during low-temperature fixing.

The present disclosure provides a toner with improved releasability while maintaining high durability and low-temperature fixability.

The present disclosure relates to a toner comprising a toner particle, the toner particle comprising
- a toner core particle and
- a shell covering the toner core particle, wherein the shell comprises an organosilicon polymer, the shell encapsulates a domain of a release agent, and in cross-sectional observation of the toner particle by a transmission electron microscope, a ratio of domains of the release agent that are not in contact with the toner core particle to a total number of the observed domains of the release agent is 85% by number or more.

According to the present disclosure, it is possible to provide a toner with improved releasability while maintaining high durability and low-temperature fixability.

Further features of the present invention will become apparent from the following description of exemplary embodiments.

BRIEF DESCRIPTION OF THE EMBODIMENTS

In the present disclosure, the expression of "from XX to YY" or "XX to YY" indicating a numerical range means a numerical range including a lower limit and an upper limit which are end points, unless otherwise specified. Also, when a numerical range is described in a stepwise manner, the upper and lower limits of each numerical range can be arbitrarily combined.

The present disclosure relates to a toner comprising a toner particle, the toner particle comprising
- a toner core particle and
- a shell covering the toner core particle, wherein the shell comprises an organosilicon polymer, the shell encapsulates a domain of a release agent, and in cross-sectional observation of the toner particle by a transmission electron microscope, a ratio of domains of the release agent that are not in contact with the toner core particle to a total number of the observed domains of the release agent is 85% by number or more.

The encapsulation of domains of a release agent (hereinafter also referred to as "release agent domains") by the shell means that the release agent domains are enveloped in the shell material and localized within the shell. The release agent domains do not necessarily have to be entirely covered with the shell, and parts of the release agent domains may be exposed on the toner particle surface to the extent that the effects of the present disclosure are not impaired.

Here, the release agent domains may or may not be in contact with the toner core particle, but preferably the release agent domains are not in contact with the toner core particle. Where the release agent domains are not in contact with the core, the release agent does not permeate into the interface between the toner core particle and the shell in the toner particle during fixing, and easily migrates out of the toner particle, resulting in improved releasability.

In particular, in cross-sectional observation of a toner particle with a transmission electron microscope, the ratio of release agent domains that are not in contact with the toner core particle to the total number of observed release agent domains (hereinafter also referred to as "non-contact ratio") is required to be 85% by number or more. In this case, since the release agent uniformly migrates out onto the toner particle surface during fixing, a sufficient releasing effect can be exhibited with respect to the amount of the release agent contained in the toner particle.

The non-contact ratio is preferably 90 to 100% by number, more preferably 95 to 100% by number, still more preferably 98 to 100% by number. The non-contact ratio can be increased by pre-coating the release agent domains with a material containing an organosilicon polymer. Further, where the release agent domains are pre-coated with a material containing an organosilicon polymer, the non-contact ratio can be reduced by lowering the coverage thereof.

Confirmation that the release agent domains are not in contact with the toner core particle can be performed using silicon mapping by TEM-EDX of the toner particle cross-section.

Further, the encapsulation of the release agent domains in the shell can be confirmed by observing the shell containing an organosilicon polymer and the release agent domains by silicon mapping by TEM-EDX of the toner particle cross section. In addition to silicon mapping, depth profile analysis using time-of-flight secondary ion mass spectrometry TOF-SIMS can be performed for confirmation by measuring fragment ion peaks corresponding to aliphatic hydrocarbon chains such as represented by the following formula (1) inside the shell.

(1)

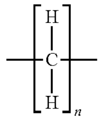

Further, the shell contains an organosilicon polymer. For example, the shell is an organosilicon polymer encapsulating release agent domains. By comprising the organosilicon polymer in the shell, it is possible to maintain sufficient strength even when the release agent domains are encapsulated. Furthermore, the shell is softened by heat during fixing and the encapsulated release agent can quickly migrate out to the outside. Based on the above, it is considered that the use of an organosilicon polymer as the shell having the release agent domains can impart high durability and sufficient release effect to the toner.

It is preferable that the depth profile analysis of the toner particle using time-of-flight secondary ion mass spectrometry TOF-SIMS reveal that in a region corresponding to the release agent domain, a fragment ion peak corresponding to the structure represented by formula (1) is present within the range of a molecular weight of 400 to 600 (more preferably 450 to 550).

When using a release agent having an aliphatic hydrocarbon chain such that a fragment ion peak appears in the above range, releasability is improved. The molecular weight of the fragment ion peak can be controlled by the release agent used.

Further, in cross-sectional observation of the toner particle with a transmission electron microscope, the average value of the minimum distance D from the surface of the toner particle to the release agent domain is preferably 5 to 50 nm, more preferably 10 to 40 nm, and still more preferably 20 to 30 nm.

When the average value of the D is 5 nm or more, the strength of the shell of the toner particle is increased and the shell is less likely to be crushed. Therefore, the toner particle is less likely to be deformed, and contamination of the member can be further suppressed. Meanwhile, when the average value of the D is 50 nm or less, the release agent is likely to migrate out from the toner particle during fixing, and the release effect is further improved.

The average value of the D can be controlled by changing the film thickness of the coating when the release agent domain is pre-coated with a material containing an organosilicon polymer. The average value of the D can also be controlled by the film thickness of the shell that covers the toner particle, the size of the release agent domains, and the number thereof.

Further, in cross-sectional observation of the toner particle with a transmission electron microscope, the ratio ($S2/S1\times100$) of the total area S2 of the release agent domains to the area S1 occupied by the toner core particle is 0.05 to 5.00% by area, more preferably 0.10 to 4.00% by area, even more preferably from 0.20 to 1.00% by area, and still more preferably 0.30 to 0.60% by area.

Where $S2/S1\times100$ is 0.05% by area or more, the amount of the release agent in the toner particle is more appropriate, so the release effect is further improved. Further, when $S2/S1\times100$ is 5.00% by area or less, the amount of the release agent contained in the shell covering the toner particle is more appropriate, so that the strength of the shell is improved and the toner particle is unlikely to deform. As a result, contamination of the member can be further suppressed.

$S2/S1\times100$ can be controlled by the number of parts of the release agent.

The area ratio (coverage ratio) of the toner particle surface occupied by the organosilicon polymer is preferably 35 to 75% by area, more preferably 45 to 70% by area, and even more preferably 50 to 65% by area.

When the coverage ratio is 75% by area or less, the presence ratio of the toner core particle on the toner particle surface is suitable, so that the toner core particle and the image-receiving paper are well fused during fixing. Along with this, releasability is further improved.

Meanwhile, when the coverage ratio is 35% by area or less, the presence ratio of the toner core particle on the toner particle surface decreases. Therefore, since the toner particle is less likely to deform, contamination of the member can be further suppressed.

Organosilicon Polymer

The organosilicon polymer is preferably a condensation polymer of at least one compound selected from the group consisting of an organosilicon compound represented by a following formula (2), an organosilicon compound represented by a following formula (3), and an organosilicon compound represented by a following formula (4).

(2)

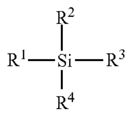

(3)

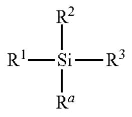

(4)

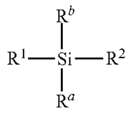

In formulas (2), (3) and (4), $R^a$ and $R^b$ are each independently an alkyl group having 1 to 8 (more preferably 1 to 3) carbon atoms, an alkenyl group having 1 to 8 (more preferably 1 to 3) carbon atoms, or a phenyl group. $R^1$, $R^2$, $R^3$ and $R^4$ each independently represent a hydrolyzable group. The hydrolyzable group is a halogen atom or an alkoxy group (preferably having 1 to 8 carbon atoms, more preferably 1 to 3 carbon atoms), which becomes a hydroxy group during the condensation reaction of the organosilicon compound and then forms a siloxane bond between the organosilicon compounds.

Di-, tri-, and tetra-functional organosilicon compounds can be used as the compounds represented by formulas (2), (3), and (4). Among them, it is preferable to use a trifunctional organosilicon compound such as represented by formula (3). That is, the organosilicon polymer is preferably a condensation polymer of an organosilicon compound containing the compound represented by formula (3), more preferably a condensation homopolymer of the organosilicon compound represented by formula (3).

Examples of bifunctional organosilicon compounds include dimethyldimethoxysilane, dimethyldiethoxysilane, and the like.

Examples of trifunctional organosilicon compounds include trifunctional alkyl group-containing silane compounds such as methyltrimethoxysilane, methyltriethoxysilane, methyldiethoxymethoxysilane, methylethoxydimethoxysilane, ethyltrimethoxysilane, ethyltriethoxysilane, propyltrimethoxysilane, propyltriethoxysilane, butyltrimethoxysilane, butyltriethoxysilane, hexyltrimethoxysilane, hexyltriethoxysilane, octyltrimethoxysilane, octyltriethoxysilane, and the like; trifunctional alkenyl group-containing silane compounds such as vinyltrimethoxysilane, vinyltriethoxysilane, allyltrimethoxysilane, allyltriethoxysilane, and the like; trifunctional aryl group-containing silane compounds such as phenyltrimethoxysilane, phenyltriethoxysilane, and the like; trifunctional methacryloxyalkyl group-containing silane compounds such as γ-methacryloxypropyltrimethoxysilane, γ-methacryloxypropyltriethoxysilane, γ-methacryloxypropyldiethoxymethoxysilane, γ-methacryloxypropylethoxydimethoxysilane, and the like; trifunctional acryloxyalkyl group-containing silane compounds such as γ-acryloxypropyltrimethoxysilane, γ-acryloxypropyltriethoxysilane, γ-acryloxypropyldiethoxymethoxysilane, γ-acryloxypropylethoxydimethoxysilane, and the like; and the like.

Examples of tetrafunctional organosilicon compounds include tetramethoxysilane, tetraethoxysilane, tetrapropoxysilane, tetrabutoxysilane, and the like.

Also, two or more organosilicon compounds may be used in combination. The organosilicon compounds to be used in combination may be the organosilicon compounds represented by formulas (2), (3) and (4), or other organosilicon compounds. Examples of organosilicon compounds other than the organosilicon compounds represented by the formulas (2), (3) and (4) include monofunctional organosilicon compounds. Examples of the monofunctional organosilicon compounds include trimethylethoxysilane, triethylmethoxysilane, triethylethoxysilane, triisobutylmethoxysilane, triisopropylmethoxysilane, tri-2-ethylhexylmethoxysilane, and the like.

Release Agent

The release agent used for the release agent domains is not particularly limited, but from the viewpoint of ensuring releasability, hydrocarbon waxes are preferable.

The release agent particles to be used for the release agent domains preferably have a number-average particle diameter of 50 to 300 nm, more preferably 70 to 120 nm. Where the release agent particles having a number average particle diameter of 50 nm or more are encapsulated in the shell, the release agent easily migrates out from the toner particle during fixing, and a more sufficient release effect can be obtained. Further, where the number-average particle diameter of the release agent-encapsulated particles is 300 nm or less, the release agent domains in the shell portion of the toner particles are less likely to be crushed, and the durability is further improved.

A hydrocarbon wax has a hydrocarbon as a skeleton, and examples thereof include Fischer-Tropsch wax, polyethylene-based wax, polypropylene-based wax, paraffin-based wax, microcrystalline wax, and the like. Among these, paraffin-based wax is more preferable. In addition, multiple types of waxes may be used.

In addition to the hydrocarbon waxes listed above, ester waxes may also be used. Examples of suitable ester waxes include esters of monohydric alcohols and aliphatic monocarboxylic acids or esters of monovalent carboxylic acids and aliphatic monoalcohols such as behenyl behenate, stearyl stearate, palmityl palmitate, and the like; esters of dihydric alcohols and aliphatic monocarboxylic acids or esters of divalent carboxylic acids and aliphatic monoalcohols such as dibehenyl sebacate, hexanediol dibehenate, and the like; esters of trihydric alcohols and aliphatic monocarboxylic acids or esters of trivalent carboxylic acids and aliphatic monoalcohols such as glycerin tribehenate and the like; esters of tetrahydric alcohols and aliphatic monocarboxylic acids or esters of tetravalent carboxylic acids and aliphatic monoalcohols such as pentaerythritol tetrastearate, pentaerythritol tetrapalmitate, and the like; esters of hexahydric alcohols and aliphatic monocarboxylic acids or esters of hexavalent carboxylic acids and aliphatic monoalcohols such as dipentaerythritol hexastearate, dipentaerythritol hexapalmitate, and the like; esters of polyhydric alcohols and aliphatic monocarboxylic acids or esters of polyvalent carboxylic acids and aliphatic monoalcohols such as polyglycerin behenate and the like; and natural ester waxes such as carnauba wax, rice wax, candelilla wax, and the like.

Also, the melting point (Tm) of the release agent used for the release agent domains is preferably 60 to 100° C. Where the melting point of the release agent is 60° C. or higher, the shell is less likely to be crushed even during long-term durability, so the toner is less likely to fuse to the developing member. Further, where the melting point of the release agent is 100° C. or lower, the release agent quickly melts during fixing, and the releasability during fixing is further improved.

Next, the colorant, binder resin, wax, charge control agent, and externally added inorganic fine particles comprised, as necessary, in the toner core particle/toner particle will be described.

Colorant

As the colorant to be comprised in the toner core particle, known pigments, dyes, magnetic bodies, and the like of black, yellow, magenta, and cyan colors as well as other colors can be used without particular limitation.

Examples of yellow pigments include monoazo compounds, disazo compounds, condensed azo compounds, isoindolinone compounds, isoindoline compounds, benzimidazolone compounds, anthraquinone compounds, azo metal complexes, methine compounds, and allylamide compounds. Specifically, C. I. Pigment Yellow 74, 93, 95, 109, 111, 128, 155, 174, 180, 185 are exemplified.

Examples of magenta pigments include mono azo compounds, condensation azo compounds, diketopyrrolopyrrole compounds, anthraquinone compounds, quinacridone compounds, basic dye lake compounds, naphthol compounds, benzimidazolone compounds, thioindigo compounds, perylene compounds. Specifically, C. I. Pigment Red 2, 3, 5, 6, 7, 23, 48:2, 48:3, 48:4, 57:1, 81:1, 122, 144, 146, 150, 166, 169, 177, 184, 185, 202, 206, 220, 221, 238, 254, 269, C. I. Pigment Violet 19 are exemplified.

Examples of cyan pigments include copper phthalocyanine compounds and derivatives thereof, anthraquinone compounds, basic dye lake compound and the like. Specifically, C. I. Pigment Blue 1, 7, 15, 15:1, 15:2, 15:3, 15:4, 60, 62, 66 are exemplified.

Examples of black pigments include carbon black, aniline black, non-magnetic ferrites, magnetite. Furthermore, those colored black using the yellow pigment, magenta pigment and cyan pigment can also be used.

Furthermore, the toner core particle can be made into a magnetic toner core particle by comprising a magnetic body. In this case, the magnetic body can also serve as a colorant. Examples of magnetic bodies include followings, iron oxides such as magnetite, hematite and ferrites; metals such as iron, cobalt and nickel, alloys of these metals and a metal such as aluminum, cobalt, copper, lead, magnesium, tin, zinc, antimony, beryllium, bismuth, cadmium, calcium, manganese, selenium, titanium, tungsten, and vanadium, and mixtures thereof.

A single one of these colorants may be used or a mixture may be used and these colorants may also be used in a solid solution state. Further, various dyes conventionally known as colorants may be used in combination with the pigments. The amount of the colorant is preferably from 1.0 to 20.0 parts by mass with respect to 100.0 parts by mass of the binder resin. When magnetic materials are used, the amount is preferably from 50.0 to 150.0 parts by mass with respect to 100.0 parts by mass of the binder resin.

Binder Resin

The toner core particle comprises a binder resin. Known resins can be used without particular limitation as the binder resin. Examples thereof include vinyl resins, polyester resins, polyamide resins, furan resins, epoxy resins, xylene resins, and silicone resins. Among these, it is preferable to use a vinyl resin.

Examples of suitable vinyl resins include homopolymers of styrene-based monomers such as styrene, α-methylstyrene, and the like, unsaturated carboxylic acid esters (for example, (meth)acrylic acid alkyl esters having an alkyl group having 1 to 8 carbon atoms) such as methyl acrylate, butyl acrylate, methyl methacrylate, 2-hydroxyethyl methacrylate, t-butyl methacrylate, 2-ethylhexyl methacrylate, and the like, unsaturated carboxylic acids such as acrylic acid, methacrylic acid, and the like, unsaturated dicarboxylic acids such as maleic acid and the like, unsaturated dicarboxylic acid anhydrides such as maleic anhydride and the like, nitrile vinyl monomers such as acrylonitrile and the like, halogen-containing vinyl monomers such as vinyl chloride and the like, nitro vinyl monomers such as nitrostyrene and the like, or copolymers thereof.

Among them, it is preferable to use copolymers of styrene-based monomers and unsaturated carboxylic acid esters.

Release Agent/Plasticizer

The toner core particle may comprises wax as a release agent and plasticizer. The toner core particles may be free of wax. Examples of the wax include those mentioned above and the following.

Esters of monohydric alcohols and aliphatic carboxylic acids such as behenyl behenate, stearyl stearate, and palmityl palmitate, or esters of monovalent carboxylic acids and aliphatic alcohols; esters of dihydric alcohols and aliphatic carboxylic acids such as dibehenyl sebacate and hexanediol dibehenate, or esters of divalent carboxylic acids and aliphatic monoalcohols; esters of thihydric alcohols and aliphatic carboxylic acids such as glycerin tribehenate, or esters of trivalent carboxylic acids and aliphatic monoalcohols; esters of tetrahydric alcohols and aliphatic monocarboxylic acids such as pentaerythritol tetrastearate and pentaerythritol tetrapalmitate, or esters of tetravalent carboxylic acids and aliphatic monoalcohols; esters of hexahydric alcohols and aliphatic monocarboxylic acids such as dipentaerythritol hexastearate and dipentaerythritol hexapalmitate, or esters of hexavalent carboxylic acids and aliphatic monoalcohols; esters of polyhydric alcohols and aliphatic monocarboxylic acids such as polyglycerin behenate, or esters of polyvalent carboxylic acids and aliphatic monoalcohols; and natural ester waxes such as carnauba wax and rice wax; petroleum-based waxes represented by paraffin wax, microcrystalline wax, petrolactam, and derivatives thereof, hydrocarbon waxes obtained by a Fischer-Tropsch method and derivatives thereof, polyolefin waxes represented by polyethylene wax, polypropylene wax, and derivatives thereof; fatty acids such as aliphatic higher alcohols, stearic acid and palmitic acid; acid amide wax.

Charge Control Agent

The toner core particle may comprises a charge control agent. As the charge control agent, conventionally known charge control agents can be used without particular limitation.

Specific examples of negative charge control agents include metal complexes of aromatic carboxylic acids represented by salicylic acid, alkylsalicylic acid, dialkylsalicylic acid, naphthoic acid, dicarboxylic acid, and the like, polymers or copolymers having sulfonic acid groups, sulfonic acid salt groups or sulfonic acid ester groups, metal salts or metal complexes of azo dyes or azo pigments, boron compounds, silicon compounds, calixarene, and the like.

Examples of positive charge control agents include quaternary ammonium salts, polymeric compounds having a quaternary ammonium salt in a side chain, guanidine compounds, nigrosine compounds, imidazole compounds, and the like. Examples of suitable polymers or copolymers having a sulfonic acid group, a sulfonic acid salt group or a sulfonic acid ester group include homopolymers of sulfonic acid group-containing vinyl monomers typified by styrenesulfonic acid, 2-acrylamido-2-methylpropanesulfonic acid, 2-methacrylamido-2-methylpropanesulfonic acid, vinylsulfonic acid, methacrylsulfonic acid, and the like, or copolymers of vinyl monomers described in the section relating to the binder resin and the abovementioned sulfonic acid group-containing vinyl monomers.

The amount of the charge control agent is preferably from 0.01 to 20.0 parts by mass with respect to 100.0 parts by mass of the binder resin.

Inorganic Fine Particles

The toner may be used as the toner particles as they are, or may be obtained by externally adding, as necessary, various inorganic fine particles to the toner particles. As the inorganic fine particles, for example, the following can be used.

Silica, titanium oxide, carbon black and carbon fluoride, metal oxides (for example, strontium titanate, cerium oxide, alumina, magnesium oxide, chromium oxide), nitrides (for example, silicon nitride), metal salts (for example, calcium sulfate, barium sulfate, calcium carbonate), fatty acid metal salts (for example, zinc stearate, calcium stearate).

Inorganic fine particles can also be subjected to a hydrophobic treatment to improve the flowability of the toner and to uniformize the charging of the toner particles. Examples of treatment agents for hydrophobic treatment of inorganic fine particles include unmodified silicone varnishes, various modified silicone varnishes, unmodified silicone oils, various modified silicone oils, silane compounds, silane coupling agents, other organosilicon compounds, and organotitanium compounds. These treatment agents may be used alone or in combination.

Next, methods for manufacturing the toner will be described, but these are not limiting.

The toner can be obtained by first separately producing release agent-encapsulated particles and toner core particles, attaching the produced release agent-encapsulated particles to the surface of the toner core particles, and then coating with an organosilicon compound polymer. This method is described below.

The toner manufacturing method preferably includes the steps of:

- obtaining release agent-encapsulated particles in which release agent particles are coated with an organosilicon polymer;
- obtaining a dispersion liquid in which toner core particles are dispersed in an aqueous medium;
- attaching the release agent-encapsulated particles to the surface of the toner core particles; and
- coating the toner core particles, to which the release agent-encapsulated particles have been attached, with an organosilicon polymer to obtain toner particles.

Method for Producing Release Agent-Encapsulated Particles

The release agent-encapsulated particles are composite particles produced by coating the release agent particles with an organosilicon polymer.

A method for producing the release agent particles is not particularly limited. For example, particles prepared by a known method such as an emulsion aggregation method, a soap-free emulsion polymerization method, a phase inversion emulsification method, a mechanical emulsification method, and the like can be used.

Next, release agent-encapsulated particles are obtained by forming a coating layer of a polymer of at least one compound selected from the group consisting of the organosilicon compounds represented by formulas (2), (3) and (4) on the surface of the obtained release agent particles. A known method can be used to form the coating layer of the organosilicon polymer on the surface of the release agent particles.

For example, there are a method of adding the organosilicon compound as it is, a method of mixing an organosilicon compound such as an alkoxysilane with an aqueous medium and adding it after hydrolysis, and the like. The organosilicon compound such as an alkoxysilane undergoes a condensation reaction after being hydrolyzed. Since the optimal pH for the hydrolysis reaction and the condensation reaction are different, it is preferable to mix the organosilicon compound and the aqueous medium in advance and add the mixture after hydrolysis at a pH at which the hydrolysis reaction is fast, because the reaction time can be shortened.

Method for Producing Toner Core Particles

A method for producing the toner core particles is not particularly limited, and suitable examples thereof include a suspension polymerization method, a dissolution suspension method, an emulsion aggregation method, a pulverization method, and the like. Where the toner core particles are produced in an aqueous medium, the dispersion liquid containing the toner core particles may be used as it is in the next step (the step of attaching the release agent-encapsulated particles), or the toner core particles may be redispersed in an aqueous medium after washing, filtering, and drying. Where the toner core particles are prepared by a dry method, they can be dispersed in an aqueous medium by a known method. In order to disperse the toner core particles in the aqueous medium, the aqueous medium preferably contains a dispersion stabilizer.

A suspension polymerization method will be described as an example of a method for producing the toner core particles.

When obtaining toner core particles by the suspension polymerization method, a polymerizable monomer that forms a binder resin and various materials (colorant, wax, charge control agent, polar resin, and the like), which are added as necessary, are melted, dissolved, or dispersed using a disperser to prepare a polymerizable monomer composition.

At this time, a solvent, a crystalline resin, a chain transfer agent, and other additives may be added, as appropriate and necessary, to adjust the viscosity. Examples of the disperser include homogenizers, ball mills, colloid mills, and ultrasonic dispersers.

Next, the polymerizable monomer composition is put into an aqueous medium including poorly water-soluble inorganic fine particles prepared in advance, and a suspension is prepared using a high-speed disperser such as a high-speed stirrer or an ultrasonic disperser (granulation step).

Examples of poorly water-soluble inorganic fine particles include phosphates such as hydroxyapatite, tricalcium phosphate, dicalcium phosphate, magnesium phosphate, aluminum phosphate, zinc phosphate, and the like, carbonates such as calcium carbonate, magnesium carbonate, and the like, metal hydroxides such as calcium hydroxide, magnesium hydroxide, aluminum hydroxide, and the like, sulfates such as calcium sulfate and barium sulfate, calcium metasilicate, bentonite, silica, alumina, and the like.

Then, a polymerization initiator is added to the polymerizable monomers in the suspension to initiate polymerization, thereby forming a binder resin and forming toner core particles (polymerization step).

The polymerization initiator may be mixed with other additives when preparing the polymerizable monomer composition or may be mixed in the polymerizable monomer composition immediately before suspending in the aqueous medium. In addition, during granulation or after completion of granulation, that is, immediately before starting the polymerization reaction, the polymerization initiator can be added in a state of being dissolved in a polymerizable monomer or another solvent, if necessary. After the polymerizable monomer is polymerized to form a binder resin, a depolymerizable monomer treatment is performed as necessary to form an aqueous dispersion liquid of toner core particles.

Also, the glass transition temperature (Tg) of the toner core particles is preferably 40 to 75° C., more preferably 40 to 65° C. Further, the toner core particles preferably have a peak molecular weight (Mp) of 5,000 to 50,000 in molecular weight distribution measured by gel permeation chromatography (GPC).

Method for Immobilizing Release Agent-Encapsulated Particles onto Surface of Toner Core Particles A method for attaching the release agent-encapsulated particles to the surface of the toner core particles is not particularly limited.

For example, the attachment may be performed by heating (for example, preferably at 40 to 70° C., more preferably 50 to 60° C.) the aqueous medium after adding the release agent-encapsulated particles to the dispersion liquid of the toner core particles, or by adding a flocculant. The above methods may be combined, and it is preferable to stir the aqueous medium in either case.

More preferably, it is desirable that the attachment be performed by heating to the abovementioned temperature in a state where the release agent-encapsulated particles and the toner core particles are present in an aqueous medium and adjusting to pH at which the release agent-encapsulated particles are easily dispersed in the aqueous medium. By this method, the release agent-encapsulated particles can be attached to the surface of the toner core particles in a dispersed state, and the aggregation of the toner core particles is less likely to occur.

The pH at which the release agent-encapsulated particles are attached to the surface of the toner core particles is preferably 5.0 to 7.0, more preferably 5.0 to 6.0. The retention time for attaching the release agent-encapsulated particles to the surface of the toner core particles is not particularly limited, but is preferably 5 min to 300 min, more preferably 30 min to 120 min.

Toner Core Particle Coating Method

Methods for coating the toner core particles, to which the release agent-encapsulated particles have been attached, with the organosilicon polymer will be described below, but these methods are not limiting.

A preferred production method involves preparing a mixed solution including an organosilicon compound or a hydrolyzate thereof and toner core particles, to which the release agent-encapsulated particles have been attached, in an aqueous medium, and then condensing the organosilicon compound. For example, a hydrolyzate of an organosilicon compound is added to a dispersion including toner core particles, to which the release agent-encapsulated particles have been attached, and the pH is controlled to condense the organosilicon compound.

The organosilicon compound can be added to and mixed with the aqueous medium by any method. For example, the organosilicon compound may be added as it is. Alternatively, the organosilicon compound may be added after being mixed with an aqueous medium and hydrolyzed. The temperature during condensation is, for example, preferably 40 to 70° C., more preferably 50 to 60° C. The retention time during condensation is not particularly limited, but is preferably 30 to 500 min, more preferably 100 to 300 min.

The pH of the aqueous medium during the progress of condensation is not particularly limited, but the pH is preferably 7.0 or higher, more preferably from 8.0 to 11.0, and even more preferably from 9.0 to 10.0.

The pH of the aqueous medium or mixed solution may be adjusted with known acids or bases. Acids for adjusting the pH include the following. Hydrochloric acid, hydrobromic acid, iodic acid, perchloric acid, perbromic acid, metaperiodic acid, permanganic acid, thiocyanic acid, sulfuric acid, nitric acid, phosphonic acid, phosphoric acid, diphosphoric acid, hexafluorophosphoric acid, tetrafluoroborate acid, tripolyphosphoric acid, aspartic acid, o-aminobenzoic acid, p-aminobenzoic acid, isonicotinic acid, oxaloacetic acid, citric acid, 2-glyceryl phosphoric acid, glutamic acid, cyanoacetic acid, oxalic acid, trichloroacetic acid, o-nitrobenzoic acid, nitroacetic acid, picric acid, picolinic acid, pyruvic acid, fumaric acid, fluoroacetic acid, bromoacetic acid, o-bromobenzoic acid, maleic acid, and malonic acid.

The following are examples of bases for adjusting the pH. Alkali metal hydroxides such as potassium hydroxide, sodium hydroxide, lithium hydroxide, and the like and aqueous solutions thereof, alkali metal carbonates such as potassium carbonate, sodium carbonate, lithium carbonate, and the like and aqueous solutions thereof, alkali metal sulfates such as potassium sulfate, sodium sulfate, lithium sulfate, and the like and aqueous solutions thereof, alkali metal phosphates such as potassium phosphate, sodium phosphate, lithium phosphate, and the like and aqueous solutions thereof, alkaline earth metal hydroxides such as calcium hydroxide, magnesium hydroxide, and the like and aqueous solutions thereof, ammonia, basic amino acids such as histidine, arginine, lysine, and the like and aqueous solutions thereof, and trishydroxymethylaminomethane.

Preferred aqueous media include water, alcohols such as methanol, ethanol, propanol, and the like and mixed solvents thereof.

Methods for measuring each physical property value are described below.

Particle Diameter of Toner Particles or Toner Core Particles

The number-average particle diameter (D1) and weight-average particle diameter (D4) of toner particles or toner core particles (hereinafter referred to as toner particles in the measurement method) are calculated as follows. A precision particle size distribution measuring apparatus based on a pore electric resistance method with a 100 μm aperture tube (a Coulter Counter Multisizer 3 produced by Beckman Coulter, Inc.) and dedicated software for the measurement apparatus (Beckman Coulter Multisizer 3 Version 3.51 produced by Beckman Coulter, Inc.) for setting measurement conditions and analysis of measured data are used for measurement. The measurements are carried out using 25,000 effective measurement channels, and then measurement data is analyzed and calculated.

A solution obtained by dissolving special grade sodium chloride in ion exchanged water at a concentration of approximately 1 mass %, such as "ISOTON II" (produced by Beckman Coulter), can be used as an aqueous electrolyte solution used in the measurements.

The dedicated software was set up in the following way before carrying out measurements and analysis.

On the "Standard Operating Method (SOMME) alteration" screen in the dedicated software, the total count number in control mode is set to 50,000 particles, the number of measurements is set to 1, and the Kd value is set to the value obtained by using "standard particle 10.0 μm" (Beckman Coulter). By pressing the "Threshold value/noise level measurement button", threshold values and noise levels are automatically set. In addition, the current is set to 1600 μA, the gain is set to 2, the electrolyte solution is set to ISOTON II, and the "Flush aperture tube after measurement" option is checked.

On the "Conversion settings from pulse to particle diameter" screen in the dedicated software, the bin interval is set to logarithmic particle diameter, the particle diameter bin is set to 256 particle diameter bin, and the particle diameter range is set to from 2 m to 60 m. The specific measurement method is as follows.

(1) 200 mL of the aqueous electrolyte solution is placed in a 250 mL glass round bottomed beaker dedicated Multisizer 3, the beaker is set on a sample stand, and a stirring rod is rotated anticlockwise at a rate of 24 rotations/second. By carrying out the "Aperture tube flush" function of the dedicated software, dirt and bubbles in the aperture tube are removed.

(2) Approximately 30 mL of the aqueous electrolyte solution is placed in a 100 mL glass flat bottomed beaker. Approximately 0.3 mL of a diluted liquid, which is obtained by diluting "Contaminon N" (a 10 mass % aqueous solution of a neutral detergent for cleaning precision measurement equipment, which has a pH of 7 and comprises a non-ionic surfactant, an anionic surfactant and an organic builder, available from Wako Pure Chemical Industries, Ltd.) approximately 3-fold in terms of mass with ion exchanged water, is added to the beaker as a dispersant.

(3) An ultrasonic wave disperser (Ultrasonic Dispersion System Tetra 150 produced by Nikkaki Bios Co., Ltd.) having an electrical output of 120 W, in which two oscillators having an oscillation frequency of 50 kHz are housed so that their phases are staggered by 1800 is prepared. Approximately 3.3 L of ion exchanged water is placed in a water bath in the ultrasonic dispersion system, and approximately 2 mL of Contaminon N is added to this water bath.

(4) The beaker mentioned in step (2) above is placed in a beaker-fixing hole in the ultrasonic wave disperser, and the ultrasonic wave disperser is activated. The height of the beaker is adjusted so that the resonant state of the liquid surface of the aqueous electrolyte solution in the beaker is at a maximum.

(5) While the aqueous electrolyte solution in the beaker mentioned in section (4) above is being irradiated with ultrasonic waves, approximately 10 mg of toner is added a little at a time to the aqueous electrolyte solution and dispersed therein. The ultrasonic wave dispersion treatment is continued for a further 60 seconds. When carrying out the ultrasonic wave dispersion, the temperature of the water bath is adjusted as appropriate to a temperature of from 10° C. to 40° C.

(6) The aqueous electrolyte solution mentioned in section (5) above, in which the toner is dispersed, is added dropwise by means of a pipette to the round bottomed beaker mentioned in section (1) above, which is disposed on the sample stand, and the measurement concentration is adjusted to approximately 5%. Measurements are carried out until the number of particles measured reaches 50,000.

(7) The weight-average particle diameter (D4) and the number-average particle diameter (D1) are calculated by analyzing measurement data using the accompanying dedicated software.

(Peak Molecular Weight of Toner Core Particles)

The peak molecular weight (Mp) of the toner core particles is measured by gel permeation chromatography (GPC) in the following manner.

First, a sample is dissolved in tetrahydrofuran (THF) at room temperature. Then, the resulting solution is filtered through a solvent-resistant membrane filter "Myshori Disc" (manufactured by Tosoh Corporation) having a pore diameter of 0.2 m to obtain a sample solution. The sample solution is adjusted so that the concentration of THF-soluble components is 0.8% by mass. This sample solution is used for measurement under the following conditions.

Apparatus: High-speed GPC apparatus "HLC-8220GPC" [manufactured by Tosoh Corporation].

Column: LF-604 two series [manufactured by Showa Denko K. K.].

Eluent: THF.

Flow rate: 0.6 mL/min.

Oven temperature: 40° C.

Sample injection volume: 0.020 mL.

For the calculation of the molecular weight of the sample, for example, the molecular weight calibration curve created using the following standard polystyrene resin is used.

Standard polystyrene resin: product name "TSK standard polystyrene F-850, F-450, F-288, F-128, F-80, F-40, F-20, F-10, F-4, F-2, F-1, A-5000, A-2500, A-1000, A-500" manufactured by Tosoh Corporation.

Particle Diameter of Release Agent Particles and Release Agent-Encapsulated Particles The number-average particle diameter of the release agent particles and the release agent-encapsulated particles is calculated by measuring the particle diameter by dynamic light scattering (DLS) using Zetasizer Nano-ZS (manufactured by Malvern Instruments, Inc.).

First, it is necessary to turn on the device power and wait 30 min for the laser to stabilize. Then the Zetasizer software is launched. Manual is selected from the Measure menu and the measurement details as shown below are entered.

Measurement mode: Particle diameter.

Material: Polystyrene latex (RI: 1.59, Absorption: 0.01).

Dispersant: Water (Temperature: 25° C., Viscosity: 0.8872 cP, RI: 1.330).

Temperature: 25.0° C.

Cell: Clear disposable zeta cell.

Measurement duration: Automatic.

The sample is prepared by diluting with water to obtain 0.50% by mass and filled in a disposable cell, and the cell is inserted into the cell holder of the device.

When the above preparations are complete, the Start button on the measurement display screen is pushed and measurement is performed.

The number-average particle diameter is calculated based on the number-based particle diameter distribution data obtained by converting, based on the Mie theory, the light intensity distribution obtained from the DLS measurement.

Confirmation of Coating Layer Formed by Organosilicon Polymer in Release Agent-Encapsulated Particles In the release agent-encapsulated particles, the coating layer formed by the organosilicon polymer is confirmed as follows. First, the release agent-encapsulated particles are sufficiently dispersed in a room-temperature-curable epoxy resin, followed by curing in an atmosphere of 40° C. for two days. Using a microtome equipped with a diamond blade, a 40-nm-thick sample is cut out from the resulting cured product.

After that, the release agent-encapsulated particles are observed using a transmission electron microscope (TEM, device name: JEM-2800 manufactured by JEOL, Ltd.). Here, silicon atom mapping is performed using EDX (energy dispersive X-ray spectroscopy). The location of the silicon atom is defined as the location of the organosilicon polymer, and it is confirmed that a coating layer of the organosilicon polymer is formed on the surface of the release agent-encapsulated particles.

Glass Transition Temperature (Tg) of Toner

The glass transition temperature (Tg) of the toner is measured according to ASTM D3418-82 using a differential scanning calorimeter "Q2000" (manufactured by TA Instruments). The melting points of indium and zinc are used to correct the temperature of the device detector, and the heat of fusion of indium is used to correct the amount of heat.

Specifically, 3 mg of toner is precisely weighed and placed in an aluminum pan, and an empty aluminum pan is used as a reference. The measurement is performed in the measurement range from 30° C. to 200° C. at a heating rate set to 10° C./min. During this heating process, a specific heat change can be obtained. The temperature at the point where the curve of the stepwise change portion of glass transition intersects with a straight line equidistant in the vertical axis direction from the extended straight line of each base line before and after obtaining the specific heat change of the reversible specific heat change curve is taken as the glass transition temperature (Tg) of the toner.

Melting Point of Release Agent

The melting point of the release agent used in the release agent particles is measured according to ASTM D3418-82 using the differential scanning calorimeter "Q2000" in the same manner as the measurement of the glass transition temperature (Tg) of the toner. The melting points of indium and zinc are used to correct the temperature of the device detector, and the heat of fusion of indium is used to correct the amount of heat.

Specifically, 1 mg of release agent particles is precisely weighed and placed in an aluminum pan, an empty aluminum pan is used as a reference, and measurement is performed by raising the temperature at a rate of 10° C./min within the measurement temperature range of 30 to 200° C. In the measurement, the temperature is once raised to 200° C. at a temperature increase rate of 10° C./min, then the temperature is lowered to 30° C. at a temperature decrease rate of 10° C./min, and then the temperature is raised again. The maximum endothermic peak of the DSC curve in the temperature range of 30 to 200° C. during the second heating process is taken as the melting point of the release agent.

Observation of Toner Particle Surface

The observation of the toner particle surface is performed as follows. Liquid nitrogen is injected, until it overflows, into an anti-contamination trap attached to the microscope body of a scanning electron microscope (SEM, device name: S-4800 manufactured by Hitachi, Ltd.) and allowed to stand for 30 min. The "PC-SEM" of the S-4800 is started and flushing is performed (cleaning of the FE chip, which is an electron source). The acceleration voltage display part of the control panel on the screen is clicked and the [Flushing] button is pressed to open a flushing execution dialog. A flushing intensity of 2 is confirmed and flushing is executed. An emission current due to flushing is confirmed to be 20 to 40 A. A sample holder with immobilized toner particles is inserted into the sample chamber of the S-4800 microscope. The [Origin] on the control panel is pressed to move the sample holder to the observation position.

The acceleration voltage display section is clicked to open an HV setting dialog, the acceleration voltage is set to [2.0 kV] and the emission current is set to [10 μA]. In the [Basic] tab of the operation panel, the signal selection is set to [SE] and the SE detector is set to [Mixed].

Similarly, in the [Basic] tab of the operation panel, the probe current of an electron optical system condition block is set to [Normal], the focus mode is set to [UHR], and the WD is set to [3.0 mm]. The [ON] button on the acceleration voltage display section of the control panel is pressed to apply the acceleration voltage.

Calculation of Toner Particle Coverage in Scanning Electron Microscope

For the area ratio (coverage ratio) occupied by the organosilicon polymer on the toner particle surface, the ratio of the bright area to the total area obtained by observing a backscattered electron image using a scanning electron microscope is used.

The area ratio of the bright area is calculated by observing the surface of the toner using a scanning electron microscope. A backscattered electron image of a 1.5 m square area of the toner surface is acquired, and an image is obtained by binarizing such that the organosilicon polymer portion in the backscattered electron image becomes a bright portion. A ratio of the bright area to the total area of the obtained image is obtained. The 1.5 m square backscattered electron image of the toner surface is acquired with a scanning electron microscope (SEM).

The specific SEM device and observation conditions are as follows.

Device used: ULTRA PLUS manufactured by Carl Zeiss Microscopy Co., Ltd.

Accelerating voltage: 1.0 kV.

WD: 2.0 mm.

Aperture size: 30.0 μm.

Detection signal: EsB (energy selective backscattered electron).

EsB Grid: 800 V.

Observation magnification: 50,000 times.

Contrast: 63.0±5.0% (reference value).

Brightness: 38.0±5.0% (reference value).

Image size: 1024×768 pixels.

Pretreatment: Toner particles are sprinkled on carbon tape (without vapor deposition).

The acceleration voltage and EsB grid are set to achieve items such as acquisition of structural information on the outermost surface of the toner particle, prevention of charge-up of undeposited samples, and selective detection of high-energy backscattered electrons. The observation field is selected near the vertex where the curvature of the toner particle is the smallest.

The area ratio of the bright area to the total area of the backscattered electron image is calculated by analyzing the backscattered electron image of the surface of the toner particle, which is obtained by the above method, by using image processing software ImageJ (developed by Wayne Rashand). The procedure is shown below.

First, the backscattered electron image is converted to 8-bit from Type in the Image menu. Next, from Filters in the Process menu, the Median diameter is set to 2.0 pixels to reduce image noise.

The image center is estimated after excluding the observation condition display section displayed at the bottom of the backscattered electron image, and a 1.5 m square range is selected from the image center of the backscattered electron image using the Rectangle Tool on the toolbar.

Next, Threshold is selected from Adjust in the Image menu. Default is selected, Auto is clicked click, and then Apply is clicked to obtain a binarized image. By this operation, the bright part of the backscattered electron image is displayed in white.

Again, the image center is estimated after excluding the observation condition display section displayed at the bottom of the backscattered electron image, and a 1.5 m square range is selected from the image center of the backscattered electron image using the Rectangle Tool on the toolbar.

Next, Histogram is selected from the Analyze menu. The Count value is read from the newly opened Histogram window (equivalent to the total area of the backscattered electron image). Also, List is clicked and the Count value when the brightness is 0 is read (corresponding to the bright area of the backscattered electron image). From the above values, the area ratio of the bright area to the total area of the backscattered electron image is calculated.

The above procedure is performed for 10 fields of view for the toner particles to be evaluated, and the number-average value is calculated as the area ratio (coverage ratio) occupied by the organosilicon polymer on the surface of the toner particle.

Observation of Release Agent Domains by Transmission Electron Microscope

The release agent domains comprised in the shell of the toner particle are observed by observing the cross-sectional layer using a transmission electron microscope (TEM, device name: JEM-2800 manufactured by JEOL, Ltd.).

The procedure for observing the cross section of the toner particle is as follows.

The toner is embedded in a visible light-curable embedding resin (D-800, manufactured by Nisshin-EM) and cut to a thickness of 70 nm with an ultrasonic ultramicrotome (UC7, manufactured by Leica).

Among the obtained flake samples, ten toner particles having a toner particle cross-sectional diameter within ±2.0 m of the weight-average particle diameter (D4) of the toner particles are arbitrarily selected.

The selected flake samples are stained in a $RuO_4$ gas atmosphere of 500 Pa for 15 min using a vacuum staining device (VSC4R1H, manufactured by Filgen, Inc.), and the scanning image mode of a scanning transmission electron microscope (JEM-2800, JEOL, Ltd) is used to generate TEM images.

The image is acquired with a TEM probe size of 1 nm and an image size of 1024×1024 pixels. In addition, a TEM image is acquired by adjusting Contrast and Brightness of the Detector Control panel of the bright field image to 1425 and 3750, respectively, and Contrast, Brightness, and Gammma of the Image Control panel to 0.0, 0.5, and 1.00, respectively.

Calculation of Average Value D of Shortest Distance from Release Agent Domains to Toner Particle Surface From the TEM image of the toner particle cross section obtained by the above method, 30 release agent domains are randomly selected, the shortest distance from each release agent domain to the toner particle surface is determined, and the average value thereof is taken as the average value of the shortest distance D from the release agent domains to the toner particle surface.

Calculation of % by Area of Release Agent Domains with Respect to Toner Core Particle In the TEM image of the toner particle cross section obtained by the above method, the areas of the toner core particle region and all release agent domains in one toner particle are found. This is performed on 10 toner particles, the arithmetic mean value of the area of the toner core particle region is defined as (S1), the arithmetic mean value of the sum of the areas of all release agent domains per one toner particle is defined as (S2), and the area ratio S2/S1×100 (% by area %) is found.

Each area can be calculated from a binarized image using the image processing software "Image J (developed by Wayne Rasband)". The calculation procedure is shown below.

(A) A TEM image is captured at a magnification such that the entire toner core particle is imaged and at a magnification such that the release agent domains can be resolved.

(B) The backscattered electron image to be analyzed is converted to 8-bit with [Image]-[Type].

(C) The scale is set with [Analyze]-[Set Scale].

(D) Areas other than the outline are blurred with [Process]-[Noise]-[Despeckle].

(E) Binarization is performed by setting a threshold with [Image]-[Adjust]-[Threshold] (a value (specifically, Auto) is set where no noise remains and the core and release agent domains to be measured remain. If necessary, [Dark background] is checked so that the toner core particle or release agent domains are painted red by the processing).

(F) With the area to be calculated painted red, a region (toner core region or release agent domain region) for which the area is to be calculated is selected using [Freehands Selections].

(G) [Area] and [Limit to Threshold] are checked in [Analyze]-[Set Measurements].

(H) The analysis is executed with [Analyze]-[Measure]. The value displayed in Results is the area of the painted region. Thus, the area of the toner core particle region and the area of all release agent domains are obtained.

(I) The same analysis is performed on the remaining 9 observed toner particles.

Calculation of Non-Contact Ratio Between Release Agent Domains and Core, and Confirmation of Domain Encapsulation Silicon atom mapping is performed on the obtained TEM image of the toner particle cross section using EDX (energy dispersive X-ray spectroscopy). The non-contact ratio between the release agent domains and the toner core particle is calculated as follows. Let X be the number of release agent domains observed in the toner particle cross section. Let Y be the number of release agent domains that are in direct contact, if only by a part thereof, with the toner core particle, without the organosilicon polymer shell interposed therebetween, among all the release agent domains. The non-contact ratio is calculated by the following formula. The calculation is performed from all release agent domains present in ten selected toner particle cross sections.

$$\text{Non-contact ratio (\% by number)}=100-(Y/X\times 100)$$

Also, from the silicon atom mapping image, it is confirmed whether the release agent domains are encapsulated in the shell containing the organosilicon polymer.

Method for Measuring Secondary Ion Mass/Secondary Ion Charge Number (m/z) by Time-of-Flight Secondary Ion Mass Spectrometry (TOF-SIMS)

For the measurement of peak intensity using TOF-SIMS, TRIFT-IV manufactured by ULVAC-PHI, Inc. is used. The device is used under the following conditions, and the fragment ion peak on the toner particle surface is confirmed.

Sample Preparation: Toner particles are attached to an indium sheet.

Sample pretreatment: None.

Primary ion: Au ion.

Accelerating voltage: 30 kV.

Charge neutralization mode: On.

Measurement mode: Positive.

Raster: 200 μm.

Measurement time: 60 sec.

In addition, depth profile analysis of toner particles is performed by sputtering the toner particles with argon gas cluster ions and scraping the surface.

The sputtering conditions are as follows.

Accelerating voltage: 10 kV.

Current: 3.4 nA.

Raster: 600 m.

Irradiation time: 5 sec.

For the depth measurement, a PMMA film is sputtered under the same conditions in advance to confirm the relationship with the irradiation time, and it was confirmed that 100 nm was removed in 300 sec.

The device is used under the above conditions to confirm that a fragment ion peak corresponding to the structure represented by formula (1) appears in the region corresponding to the release agent domain. Where the region corresponding to the release agent domain does not appear within the above irradiation time, the sputtering is repeated until the release agent domain appears. The fragment ion peak corresponding to the structure represented by formula (1) is characterized in that the molecular weight appears at intervals of 14.

In addition to the silicon atom mapping, it may be confirmed in detail whether the release agent domain is comprised in the shell by whether the fragment ion peak appears due to sputtering by depth profile analysis.

EXAMPLE

The present invention will be described in more detail hereinbelow with reference to Examples and Comparative Examples, but the present invention is not limited thereto. Unless otherwise specified, the "parts" and "%" used in the examples are based on mass.

Preparation of Organosilicon Compound Liquid 1

| | |
|---|---|
| Ion-exchanged water | 50.0 parts |
| Methyltrimethoxysilane (organosilicon compound) | 50.0 parts |

The above materials were mixed, and the pH was adjusted to 4.0 with 1 mol/L hydrochloric acid. After that, the mixture was stirred for 1 h while being heated at 60° C. in a water bath to prepare an organosilicon compound liquid 1.

Preparation of Organosilicon Compound Liquids 2 to 4

Organosilicon compound liquids 2 to 4 were prepared in the same manner as the organosilicon compound liquid 1, except that the type of the organosilicon compound was changed as shown in Table 1 below.

TABLE 1

| | Organosilicon compound |
|---|---|
| Organosilicon compound liquid 1 | methyltrimethoxysilane |
| Organosilicon compound liquid 2 | phenyltriethoxysilane |
| Organosilicon compound liquid 3 | dimethyldimethoxysilane |
| Organosilicon compound liquid 4 | tetraethoxysilane |

Preparation of Release Agent Particles 1

Release agent (HNP-9 (paraffin wax), melting point 75° C., Japanese wax) 20 parts Anionic surfactant (manufactured by DKS Co., Ltd.: NEOGEN RK) 1 part Ion-exchanged water 45 parts The above materials were put into a mixing container equipped with a stirrer and then heated to 90° C. Next, the dispersion treatment was performed for 60 min by stirring at a rotor rotation speed of 19,000 rpm and a screen rotation speed of 18,000 rpm at a shear stirring portion with a rotor outer diameter of 3 cm and a clearance of 0.3 mm, while circulating to Clearmix W Motion CLM-2.2/3.7W (manufactured by M Technique Co., Ltd.).

After that, the dispersion liquid of release agent particles 1 was obtained by cooling to 40° C. under the conditions of a rotor rotation speed of 1000 rpm, a screen rotation speed of 0 rpm, and a cooling rate of 10° C./min.

The number-average particle diameter (D1) of the obtained release agent particles 1 was 90 nm.

Preparation of Release Agent Particles 2 to 7

Dispersion liquids of release agent particles 2 to 7 were prepared in the same manner as in the preparation of the release agent particles 1, except that the type of dispersoid used, the number of parts of the anionic surfactant, and the stirring conditions were changed as shown in Table 2 below.

Preparation of Resin Particles 8

A total of 150 parts of a 1.5% aqueous solution of NEOGEN RK (manufactured by DKS Co., Ltd.) was added to and dispersed in the oil phase obtained by mixing 78.0 parts of styrene and 22.0 parts of butyl acrylate.

An aqueous solution of 0.3 parts of potassium persulfate in 10.0 parts of ion-exchanged water was added while stirring slowly for another 10 min. After purging with nitrogen, emulsion polymerization was carried out at 70° C. for 6 h. After completion of the polymerization, the reaction solution was cooled to room temperature, and ion-exchanged water was added to obtain an aqueous dispersion of resin particles 8 having a solid fraction concentration of 12.5% by mass. The number average particle diameter (D1) of the resin particles 8 was 250 nm.

The resin particles 8 do not have releasability and are not release agent particles.

TABLE 2

| | Dispersoid | Surfactant (parts) | Rotor rotation speed (rpm) | Screen rotation speed (rpm) | number-average particle diameter (nm) |
|---|---|---|---|---|---|
| Release agent particles 1 | HNP-9 | 1 | 19000 | 18000 | 90 |
| Release agent particles 2 | HNP-9 | 1 | 17500 | 17500 | 130 |
| Release agent particles 3 | carnauba wax | 1 | 17000 | 17000 | 180 |
| Release agent particles 4 | candelilla wax | 1 | 15000 | 15000 | 320 |
| Release agent particles 5 | behenyl behenate | 1 | 19000 | 18000 | 80 |
| Release agent particles 6 | EXCEREX 48070B | 1 | 18000 | 18000 | 105 |
| Release agent particles 7 | EXCEREX 15341PA | 3 | 19000 | 18000 | 45 |

EXCEREX 48070B and EXCEREX 15341PA are polyethylene waxes (manufactured by Mitsui Chemicals, Inc.).

Preparation of Release Agent-Encapsulated Particles 1

Release agent particles 1: 7.0 parts

Organosilicon compound liquid 1: 4.0 parts

Ion-exchanged water: 500 parts

The above materials were put into a mixing container equipped with a stirrer, the pH was adjusted to 9.6 with a 7.3% sodium hydrogen carbonate aqueous solution, and stirring was performed at room temperature for 5 h to obtain a dispersion liquid of the release agent-encapsulated particles 1.

Preparation of Release Agent-Encapsulated Particles 2 to 11

Dispersion liquids of release agent-encapsulated particles 2 to 11 were obtained in the same manner as in the preparation of the release agent-encapsulated particles 1, except that the amount of the organosilicon compound liquid 1 was changed as shown in Table 3 below.

Preparation of Release Agent-Encapsulated Particles 12 to 17 and Resin-Encapsulated Particles 18

Dispersion liquids of release agent-encapsulated particles 12 to 17 and resin-encapsulated particles 18 were obtained in the same manner as in the preparation of the release agent-encapsulated particles 1, except that the type of the release agent particles was changed as shown in Table 3 below.

TABLE 3

| | Release agent particles | | Organosilicon compound liquid | |
|---|---|---|---|---|
| | Type | Parts | Type | Parts |
| Release agent-encapsulated particles 1 | release agent particles 1 | 7.0 | organosilicon compound liquid 1 | 4.0 |
| Release agent-encapsulated particles 2 | release agent particles 1 | 7.0 | organosilicon compound liquid 1 | 0.1 |
| Release agent-encapsulated particles 3 | release agent particles 1 | 7.0 | organosilicon compound liquid 1 | 0.2 |
| Release agent-encapsulated particles 4 | release agent particles 1 | 7.0 | organosilicon compound liquid 1 | 0.3 |
| Release agent-encapsulated particles 5 | release agent particles 1 | 7.0 | organosilicon compound liquid 1 | 0.4 |
| Release agent-encapsulated particles 6 | release agent particles 1 | 7.0 | organosilicon compound liquid 1 | 0.5 |
| Release agent-encapsulated particles 7 | release agent particles 1 | 7.0 | organosilicon compound liquid 1 | 0.6 |
| Release agent-encapsulated particles 8 | release agent particles 1 | 7.0 | organosilicon compound liquid 1 | 0.8 |
| Release agent-encapsulated particles 9 | release agent particles 1 | 7.0 | organosilicon compound liquid 1 | 1.6 |
| Release agent-encapsulated particles 10 | release agent particles 1 | 7.0 | organosilicon compound liquid 1 | 6.0 |
| Release agent-encapsulated particles 11 | release agent particles 1 | 7.0 | organosilicon compound liquid 1 | 8.0 |
| Release agent-encapsulated particles 12 | release agent particles 2 | 7.0 | organosilicon compound liquid 1 | 4.0 |
| Release agent-encapsulated particles 13 | release agent particles 3 | 7.0 | organosilicon compound liquid 1 | 4.0 |
| Release agent-encapsulated particles 14 | release agent particles 4 | 7.0 | organosilicon compound liquid 1 | 4.0 |
| Release agent-encapsulated particles 15 | release agent particles 5 | 7.0 | organosilicon compound liquid 1 | 4.0 |
| Release agent-encapsulated particles 16 | release agent particles 6 | 7.0 | organosilicon compound liquid 1 | 4.0 |
| Release agent-encapsulated particles 17 | release agent particles 7 | 7.0 | organosilicon compound liquid 1 | 4.0 |
| Resin-encapsulated particles 18 | resin particles 8 | 7.0 | organosilicon compound liquid 1 | 4.0 |

Preparation of Toner Core Particles 1

A total of 14.0 parts of sodium phosphate (dodecahydrate, manufactured by Rasa Industries, Ltd.) was added to 390.0 parts of ion-exchanged water in a reaction container, and the mixture was kept at 65° C. for 1.0 h while purging with nitrogen.

A calcium chloride aqueous solution in which 9.2 parts of calcium chloride (dihydrate) was dissolved in 10.0 parts of ion-exchanged water was put into the container all at once, while stirring at 12,000 rpm by using a T. K. Homomixer (manufactured by Tokushu Kika Kogyo Co., Ltd.), to prepare an aqueous medium containing a dispersion stabilizer. Furthermore, 10% hydrochloric acid was added to the aqueous medium in the reaction container to adjust the pH to 6.0, thereby preparing an aqueous medium 1.

Preparation of Polymerizable Monomer Composition

| | |
|---|---|
| Styrene | 60.0 parts |
| C. I. Pigment Blue 15:3 | 6.5 parts |

The above materials were put into an attritor (manufactured by Nippon Coke Kogyo Co., Ltd.), and further dispersed using zirconia particles with a diameter of 1.7 mm at 220 rpm for 5.0 h to prepare a pigment dispersion liquid.

Then, the following materials were added to the pigment dispersion liquid.

| | |
|---|---|
| Styrene | 10.0 parts |
| n-Butyl acrylate | 30.0 parts |
| Polyester resin | 5.0 parts |

(Condensation Product of Terephthalic Acid and 2 Mol Propylene Oxide Adduct of Bisphenol a, Weight-Average Molecular Weight 10,000, Acid Value: 8.2 mg KOH/g)

The mixture was kept at 65° C. and uniformly dissolved and dispersed at 500 rpm using T. K. Homomixer to prepare a polymerizable monomer composition.

Granulation Step

While maintaining the temperature of the aqueous medium 1 at 70° C. and the rotation speed of the stirring device at 12,000 rpm, the polymerizable monomer composition was put into the aqueous medium 1, and 9.0 parts of t-butyl peroxypivalate as a polymerization initiator was added. The mixture was granulated for 10 min while maintaining 12,000 rpm with a stirring device.

Polymerization Step

The high-speed stirring device was changed to a stirrer with a propeller stirring blade, polymerization was performed for 5.0 h while maintaining the temperature at 70° C. and stirring at 150 rpm, the temperature was then raised to 85° C. and heating was carried out for 2.0 h to conduct a polymerization reaction and obtain a dispersion liquid of toner core particles 1. The weight-average particle diameter (D4) of the toner core particles 1 was 6.7 m.

Preparation of Toner Core Particles 2

First, a pigment dispersion liquid was prepared in the same manner as in the method for preparing the toner core particles 1. Next, the following materials were added to the pigment dispersion, and then granulation and polymerization were carried out in the same manner as in the method for preparing the toner core particles 1 to obtain a dispersion liquid of toner core particles 2. The weight-average particle diameter (D4) of the toner core particles 2 was 6.8 m.

| | |
|---|---|
| Styrene | 10.0 parts |
| n-Butyl acrylate | 30.0 parts |
| Polyester resin | 5.0 parts |

(Condensation Product of Terephthalic Acid and 2 Mol Propylene Oxide Adduct of Bisphenol a, Weight-Average Molecular Weight 10,000, Acid Value: 8.2 mg KOH/g)

Release agent (HNP-9, melting point 75° C., manufactured by Nippon Seiro Co., Ltd.) 5.0 parts Manufacturing Method of Toner 1

The following samples were weighed into a reaction container and mixed using a propeller stirring blade.

Toner core particles 1: 100 parts

Release agent-encapsulated particles 1: 58 parts

Next, the temperature of the mixed liquid was raised to 55° C. and then kept for 1 h while mixing using the propeller stirring blade.

Next, the pH of the mixed solution was adjusted to 5.6, then 2.8 parts of the organosilicon compound solution 1 was added and stirred, the pH was adjusted to 9.6 by using a 7.3% sodium hydrogen carbonate aqueous solution, stirring using the propeller stirring blade was performed for 4 h, and then air-cooling was performed until the temperature reached 25° C.

A 10% hydrochloric acid aqueous solution was added to the obtained mixed solution to adjust the pH to 1.5, and after stirring for 2 h, toner particles 1 were obtained by filtering, washing with water, and drying. These particles were designated as toner 1.

Manufacturing Method of Toners 2 to 19 and 22

Toners 2 to 19 and 22 were obtained in the same manner and in the manufacturing method of toner 1, except that the types and amounts of the organosilicon compound liquid and release agent-encapsulated particles were changed as shown in Table 4.

Manufacturing Method of Toner 20

The following samples were weighed into a reaction container and mixed using a propeller stirring blade.

Toner core particles 1: 100 parts

Release agent-encapsulated particles 1: 58 parts

Next, the temperature of the mixed liquid was raised to 55° C. and then kept for 1 h while mixing using the propeller stirring blade.

Next, the pH of the mixed solution was adjusted to 5.6, then 1.4 parts of the organosilicon compound solution 1 was added and stirred, the pH was adjusted to 11.6 by using 1 mol/L sodium hydroxide aqueous solution, stirring using the propeller stirring blade was performed for 4 h, and then air-cooling was performed until the temperature reached 25° C.

A 10% hydrochloric acid aqueous solution was added to the obtained mixed solution to adjust the pH to 1.5, and after stirring for 2 h, toner particles 20 were obtained by filtering, washing with water, and drying. These particles were designated as toner 20.

Manufacturing Method of Toner 21

The following samples were weighed into a reaction container and mixed using a propeller stirring blade.

Toner core particles 1: 100 parts

Release agent-encapsulated particles 1: 58 parts

Next, the temperature of the mixed liquid was raised to 55° C. and then kept for 1 h while mixing using the propeller stirring blade.

Next, the pH of the mixed solution was adjusted to 5.6, then 2.1 parts of the organosilicon compound solution 1 was added and stirred, the pH was adjusted to 11.6 by using 1 mol/L sodium hydroxide aqueous solution, stirring using the propeller stirring blade was performed for 4 h, and then air-cooling was performed until the temperature reached 25° C.

A 10% hydrochloric acid aqueous solution was added to the obtained mixed solution to adjust the pH to 1.5, and after stirring for 2 h, toner particles 21 were obtained by filtering, washing with water, and drying. These particles were designated as toner 21.

Manufacturing Method of Toner 23

The following samples were weighed into a reaction container and mixed using a propeller stirring blade.

Toner core particles 1: 100 parts

Release agent-encapsulated particles 1: 58 parts

Next, the temperature of the mixed liquid was raised to 55° C. and then kept for 1 h while mixing using the propeller stirring blade.

Next, the pH of the mixed solution was adjusted to 5.6, 2.6 parts of the organosilicon compound solution 1 was added and stirred, the pH was adjusted to 9.6 by using a 7.3% sodium hydrogen carbonate aqueous solution and stirring was performed using a propeller stirrer blade. After 10 min, 1.5 parts of organosilicon compound liquid 1 was added and stirring was performed using the propeller stirrer blade.

After holding for 4 h, air-cooling was performed until the temperature reached 25° C. A 10% hydrochloric acid aqueous solution was added to the obtained mixed solution to adjust the pH to 1.5, and after stirring for 2 h, toner particles 23 were obtained by filtering, washing with water, and drying. These particles were designated as toner 23.

Manufacturing Method of Toner 24

The following samples were weighed into a reaction container and mixed using a propeller stirring blade.

Toner core particles 1: 100 parts

Release agent-encapsulated particles 1: 58 parts

Next, the temperature of the mixed liquid was raised to 55° C. and then kept for 1 h while mixing using the propeller stirring blade.

Next, the pH of the mixed solution was adjusted to 5.6, then 3.0 parts of the organosilicon compound solution 1 was added and stirred, the pH was adjusted to 2.5 by using 10% hydrochloric acid aqueous solution, stirring using the propeller stirring blade was performed for 4 h, and then air-cooling was performed until the temperature reached 25° C.

A 10% hydrochloric acid aqueous solution was added to the obtained mixed solution to adjust the pH to 1.5, and after stirring for 2 h, toner particles 24 were obtained by filtering, washing with water, and drying. These particles were designated as toner 24.

TABLE 4

| | Toner core particles | | Release agent-encapsulated particles | | Organosilicon compound liquid | |
|---|---|---|---|---|---|---|
| | No. | Parts | No. | Parts | No. | Parts |
| Toner 1 | 1 | 100 | 1 | 58 | 1 | 2.8 |
| Toner 2 | 1 | 100 | 7 | 58 | 1 | 2.8 |
| Toner 3 | 1 | 100 | 6 | 58 | 1 | 2.8 |
| Toner 4 | 1 | 100 | 5 | 58 | 1 | 2.8 |
| Toner 5 | 1 | 100 | 1 | 58 | 2 | 2.8 |
| Toner 6 | 1 | 100 | 1 | 58 | 3 | 2.8 |
| Toner 7 | 1 | 100 | 1 | 58 | 4 | 2.8 |
| Toner 8 | 1 | 100 | 13 | 58 | 1 | 2.8 |

TABLE 4-continued

| | Toner core particles | | Release agent-encapsulated particles | | Organosilicon compound liquid | |
|---|---|---|---|---|---|---|
| | No. | Parts | No. | Parts | No. | Parts |
| Toner 9 | 1 | 100 | 14 | 58 | 1 | 2.8 |
| Toner 10 | 1 | 100 | 15 | 58 | 1 | 2.8 |
| Toner 11 | 1 | 100 | 16 | 58 | 1 | 2.8 |
| Toner 12 | 1 | 100 | 8 | 58 | 1 | 0.6 |
| Toner 13 | 1 | 100 | 9 | 58 | 1 | 1.1 |
| Toner 14 | 1 | 100 | 10 | 58 | 1 | 4.0 |
| Toner 15 | 1 | 100 | 11 | 58 | 1 | 4.6 |
| Toner 16 | 1 | 100 | 1 | 11 | 1 | 2.8 |
| Toner 17 | 1 | 100 | 1 | 116 | 1 | 2.8 |
| Toner 18 | 1 | 100 | 1 | 580 | 1 | 2.8 |
| Toner 19 | 1 | 100 | 12 | 800 | 1 | 2.8 |
| Toner 20 | 1 | 100 | 1 | 58 | 1 | 1.4 |
| Toner 21 | 1 | 100 | 1 | 58 | 1 | 2.1 |
| Toner 22 | 1 | 100 | 1 | 58 | 1 | 2.5 |
| Toner 23 | 1 | 100 | 1 | 58 | 1 | 2.6 parts/1.5 parts |
| Toner 24 | 1 | 100 | 17 | 58 | 1 | 3.0 |

Manufacturing Method of Comparative Toner 1

A total of 100 parts of toner core particles 2 were weighed into a reaction container and mixed using a propeller stirring blade.

Next, the pH of the mixed solution was adjusted to 5.6, then 2.8 parts of the organosilicon compound solution 1 was added and stirred, the pH was adjusted to 9.6 by using a 7.3% sodium hydrogen carbonate aqueous solution, stirring using the propeller stirring blade was performed for 4 h, and then air-cooling was performed until the temperature reached 25° C.

A 10% hydrochloric acid aqueous solution was added to the obtained mixed solution to adjust the pH to 1.5, and after stirring for 2 h, comparative toner 1 was obtained by filtering, washing with water, and drying.

Manufacturing Method of Comparative Toner 2

The following samples were weighed into a reaction container and mixed using a propeller stirring blade.

Resin-encapsulated particles 18: 58 parts

Toner core particles 2: 100 parts

Next, the temperature of the mixed liquid was raised to 55° C. and then kept for 1 h while mixing using the propeller stirring blade.

Next, the pH of the mixed solution was adjusted to 5.6, then 2.8 parts of the organosilicon compound solution 1 was added and stirred, the pH was adjusted to 9.6 by using a 7.3% sodium hydrogen carbonate aqueous solution, stirring using the propeller stirring blade was performed for 4 h, and then air-cooling was performed until the temperature reached 25° C.

A 10% hydrochloric acid aqueous solution was added to the obtained mixed solution to adjust the pH to 1.5, and after stirring for 2 h, comparative toner 2 was obtained by filtering, washing with water, and drying.

Manufacturing Method of Comparative Toner 3

A comparative toner 3 was obtained in the same manner as in the manufacturing method of the toner 1, except that the release agent-encapsulated particles 4 were used.

Manufacturing Method of Comparative Toner 4

A comparative toner 4 was obtained in the same manner as in the manufacturing method of the toner 1, except that the release agent-encapsulated particles 3 were used.

Manufacturing Method of Comparative Toner 5

A comparative toner 5 was obtained in the same manner as in the manufacturing method of the toner 1, except that the release agent-encapsulated particles 2 were used.

Manufacturing Method of Comparative Toner 6

The following samples were weighed into a reaction container and mixed using a propeller stirring blade.

Release agent-encapsulated particles 1: 0.7 parts

Toner core particles 1: 100 parts

Next, the temperature of the mixed liquid was raised to 55° C. and then kept for 1 h while mixing using the propeller stirring blade.

Next, the pH of the mixed solution was adjusted to 5.6, then 2.8 parts of the organosilicon compound solution 1 was added and stirred, the pH was adjusted to 9.6 by using a 7.3% sodium hydrogen carbonate aqueous solution, stirring using the propeller stirring blade was performed for 4 h, and then air-cooling was performed until the temperature reached 25° C.

A 10% hydrochloric acid aqueous solution was added to the obtained mixed solution to adjust the pH to 1.5, and after stirring for 2 h, comparative toner 6 was obtained by filtering, washing with water, and drying.

Physical Properties of Toners 1 to 24 and Comparative Toners 1 to 6

Tables 5-1 and 5-2 below shows the physical property values of the toners produced in Examples 1 to 24 and Comparative Examples 1 to 6.

TABLE 5-1

| | Toner | Domain encapsulation of release agent | Non-contact rate (%) | The molecular weight of formula (1) |
|---|---|---|---|---|
| Example 1 | Toner 1 | yes | 100 | 503 |
| Example 2 | Toner 2 | yes | 96 | 503 |
| Example 3 | Toner 3 | yes | 90 | 503 |
| Example 4 | Toner 4 | yes | 85 | 503 |

TABLE 5-1-continued

| | Toner | Domain encapsulation of release agent | Non-contact rate (%) | The molecular weight of formula (1) |
|---|---|---|---|---|
| Example 5 | Toner 5 | yes | 100 | 503 |
| Example 6 | Toner 6 | yes | 100 | 503 |
| Example 7 | Toner 7 | yes | 100 | 503 |
| Example 8 | Toner 8 | yes | 100 | No structure of formula (1) |
| Example 9 | Toner 9 | yes | 100 | No structure of formula (1) |
| Example 10 | Toner 10 | yes | 100 | No structure of formula (1) |
| Example 11 | Toner 11 | yes | 100 | 545 |
| Example 12 | Toner 12 | yes | 100 | 503 |
| Example 13 | Toner 13 | yes | 100 | 503 |
| Example 14 | Toner 14 | yes | 100 | 503 |
| Example 15 | Toner 15 | yes | 100 | 503 |
| Example 16 | Toner 16 | yes | 100 | 503 |
| Example 17 | Toner 17 | yes | 100 | 503 |
| Example 18 | Toner 18 | yes | 100 | 503 |
| Example 19 | Toner 19 | yes | 100 | 503 |
| Example 20 | Toner 20 | yes | 100 | 503 |
| Example 21 | Toner 21 | yes | 100 | 503 |
| Example 22 | Toner 22 | yes | 100 | 503 |
| Example 23 | Toner 23 | yes | 100 | 503 |
| Example 24 | Toner 24 | yes | 100 | 485 |
| Comparative Example 1 | Comparative Toner 1 | no | | |
| Comparative Example 2 | Comparative Toner 2 | no | 100 | No structure of formula (1) |
| Comparative Example 3 | Comparative Toner 3 | yes | 80 | 503 |
| Comparative Example 4 | Comparative Toner 4 | yes | 70 | 503 |
| Comparative Example 5 | Comparative Toner 5 | yes | 50 | 503 |
| Comparative Example 6 | Comparative Toner 6 | no | 0 | 503 |

TABLE 5-2

| | Average value of the minimum distance D (nm) | Area % S2/S1 × 100 | Coverage ratio |
|---|---|---|---|
| Example 1 | 25 | 0.40% | 58% |
| Example 2 | 23 | 0.40% | 61% |
| Example 3 | 20 | 0.40% | 57% |
| Example 4 | 22 | 0.40% | 59% |
| Example 5 | 20 | 0.40% | 65% |
| Example 6 | 22 | 0.40% | 63% |
| Example 7 | 28 | 0.40% | 65% |
| Example 8 | 24 | 0.40% | 61% |
| Example 9 | 25 | 0.40% | 57% |
| Example 10 | 25 | 0.40% | 58% |
| Example 11 | 22 | 0.40% | 62% |
| Example 12 | 5 | 0.40% | 52% |
| Example 13 | 16 | 0.40% | 55% |
| Example 14 | 42 | 0.40% | 61% |
| Example 15 | 50 | 0.40% | 65% |
| Example 16 | 28 | 0.05% | 58% |
| Example 17 | 25 | 0.70% | 58% |
| Example 18 | 21 | 3.50% | 60% |
| Example 19 | 18 | 5.00% | 62% |
| Example 20 | 17 | 0.40% | 35% |
| Example 21 | 20 | 0.40% | 41% |
| Example 22 | 24 | 0.40% | 50% |
| Example 23 | 30 | 0.40% | 75% |
| Example 24 | 15 | 0.40% | 100% |
| Comparative Example 1 | | | 60% |
| Comparative Example 2 | 25 | 0.40% | 61% |
| Comparative Example 3 | 22 | 0.40% | 58% |
| Comparative Example 4 | 22 | 0.40% | 62% |
| Comparative Example 5 | 22 | 0.40% | 58% |

TABLE 5-2-continued

| | Average value of the minimum distance D (nm) | Area % S2/S1 × 100 | Coverage ratio |
|---|---|---|---|
| Comparative Example 6 | 22 | 0.40% | 60% |

In the table, "Domain encapsulation" is indicated as "yes" when the release agent domains are encapsulated in the shell, and "no" when the domains are not encapsulated (in comparative toner 2, resin particles were encapsulated; in comparative toner 6, the release agent domains on the surface of the toner core particles were coated with the organosilicon polymer, but not encapsulated).

The % of non-contact rate is % by number. The molecular weight of formula (1) indicates the molecular weight of the fragment ion peak corresponding to the structure represented by formula (1) in TOF-SIMS. The coverage ratio is the area ratio (coverage ratio: % by area) occupied by the organosilicon polymer on the toner particle surface.

Toner Evaluation

The following evaluations were performed using toners 1 to 24 and comparative toners 1 to 6.

Evaluation of Fixing Performance

Low-temperature fixability is evaluated by evaluating the lowest fixing temperature at which visible image defects do not occur in the fixed image.

Examples of the main types of visible image defects that occur during low-temperature fixing include cold offset, which occurs when the toner does not melt, and blisters, which occur when the toner is not sufficiently melted and the adhesion between the fixing roller and the toner is high.

A blister is an image defect in which a part of the fixed image is peeled off by a fixing roller in the fixing step and is visually recognized as minute blank dots in the fixed image.

As for the temperature at which these image defects occur, cold offset occurs at a lower temperature, and blisters occur in a range of increased fixing temperature. The evaluation was performed in the following manner.

A color laser printer (HP Color LaserJet 3525dn, manufactured by HP) with the fixing unit removed was prepared, toner was removed from the black cartridge, cyan cartridge, and magenta cartridge, and 50 g of toner to be evaluated was filled instead in each cartridge.

Next, an unfixed toner image of 2.0 cm long and 15.0 cm wide (toner laid-on level: 1.2 $mg/cm^2$) was formed using the filled toner on image-receiving paper (A4 size OceRedLabel paper (basic weight 80 $g/m^2$) manufactured by Canon Inc.) in a portion that is 1.0 cm from the upper end in the paper-passing direction.

Next, the removed fixing unit was modified so that the fixing temperature and process speed could be adjusted, and the modified fixing unit was used to conduct a fixing test for unfixed images.

First, under a normal temperature and normal humidity environment (23° C., 60% RH), the process speed was set to 230 mm/s, the initial temperature was set to 155° C., and the set temperature was gradually increased by 5° C. At each temperature, the abovementioned unfixed image was fixed. Low-temperature fixability of the resulting fixed image was evaluated based on the following criteria, with the fixing temperature at which cold offset did not occur and the number of blister-derived blank dots was 2 or less being defined as the minimum fixing temperature. Table 6 shows the results.

A: Minimum fixing temperature is 160° C. or less.
B: Minimum fixing temperature is 165° C. or 170° C.
C: Minimum fixing temperature is 175° C. or 180° C.
D: Minimum fixing temperature is 185° C. or 190° C.

Evaluation of Releasability

In the above fixing test, the releasability was evaluated according to the following evaluation criteria.

High-temperature offset (H. O.) is a phenomenon in which a portion of the toner is fused to the fixing roller during high-temperature fixing. This phenomenon is likely to occur at a lower fixing temperature with a toner with lower releasability. The evaluation criteria are as follows. Table 6 shows the results.

A: The maximum temperature at which high-temperature offset does not occur is the minimum fixing temperature plus 50° C. or more.

B: The maximum temperature at which high-temperature offset does not occur is the minimum fixing temperature plus 40° C. or more and less than 50° C.

C: The maximum temperature at which high-temperature offset does not occur is the minimum fixing temperature plus 30° C. or more and less than 40° C.

D: The maximum temperature at which high temperature offset does not occur is the minimum fixing temperature plus less than 30° C.

Evaluation of Contamination of the Member

Toners 1 to 24 and comparative toners 1 to 6 were evaluated for contamination of the member by the following method.

First, a color laser printer (LBP-712Ci, manufactured by Canon Inc.) that was modified so that the process speed was 300 mm/sec was used. Next, the toner in the cyan cartridge was taken out, and 100 g each of toners 1 to 24 and comparative toners 1 to 6 were filled in this cartridge. After that, the following evaluations were performed.

The cartridge was mounted on the cyan station of the printer, and one image of a chart with a print percentage of 0.2% was output using A4 size plain paper office 70 (manufactured by Canon Marketing Japan, 70 $g/m^2$) under normal temperature and normal humidity (temperature 23° C., humidity 60% RH). After that, the operation of outputting two sheets and stopping for 10 sec was repeated, the development blade and the development roller were visually observed every time 1,000 images were output while supplying the toner, and the presence or absence of toner fusion was confirmed. Using the output number of sheets at which resin fusion occurred as an index, contamination of the member was evaluated according to the following criteria. Table 6 shows the results.

A: No fusion occurred on both the developing blade and the developing roller up to 16,000 sheets.

B: Fusion occurred on the developing blade/developing roller after more than 10,000 sheets and up to 16,000 sheets.

C: Fusion occurred on the developing blade/developing roller after more than 5000 sheets and up to 10,000 sheets.

D: Fusion occurred on the developing blade/developing roller before 5000 sheets.

Evaluation of Toners 1-24 and Comparative Toners 1-6

Table 6 shows the evaluation results of the toners produced in Examples 1-24 and Comparative Examples 1-6.

TABLE 6

| | | Contamination of the Member | | Releasability | | Fixing Performance | |
|---|---|---|---|---|---|---|---|
| Example 1 | Toner 1 | A | 16000 sheets | A | 55° C. | A | 155° C. |
| Example 2 | Toner 2 | A | 16000 sheets | A | 50° C. | A | 160° C. |
| Example 3 | Toner 3 | A | 16000 sheets | B | 45° C. | A | 160° C. |
| Example 4 | Toner 4 | A | 16000 sheets | B | 40° C. | A | 160° C. |
| Example 5 | Toner 5 | B | 15000 sheets | A | 55° C. | A | 155° C. |
| Example 6 | Toner 6 | B | 13000 sheets | A | 55° C. | A | 155° C. |
| Example 7 | Toner 7 | A | 16000 sheets | A | 55° C. | B | 165° C. |
| Example 8 | Toner 8 | A | 16000 sheets | B | 40° C. | A | 160° C. |
| Example 9 | Toner 9 | A | 16000 sheets | B | 40° C. | A | 160° C. |
| Example 10 | Toner 10 | A | 16000 sheets | B | 45° C. | A | 160° C. |
| Example 11 | Toner 11 | A | 16000 sheets | A | 55° C. | A | 155° C. |
| Example 12 | Toner 12 | B | 15000 sheets | A | 55° C. | A | 155° C. |
| Example 13 | Toner 13 | A | 16000 sheets | A | 55° C. | A | 155° C. |
| Example 14 | Toner 14 | A | 16000 sheets | A | 55° C. | B | 165° C. |

TABLE 6-continued

| | | Contamination of the Member | | Releasability | | Fixing Performance | |
|---|---|---|---|---|---|---|---|
| Example 15 | Toner 15 | A | 16000 sheets | A | 55° C. | B | 170° C. |
| Example 16 | Toner 16 | A | 16000 sheets | B | 45° C. | A | 160° C. |
| Example 17 | Toner 17 | A | 16000 sheets | A | 50° C. | A | 160° C. |
| Example 18 | Toner 18 | B | 15000 sheets | A | 55° C. | A | 155° C. |
| Example 19 | Toner 19 | B | 14000 sheets | A | 55° C. | A | 155° C. |
| Example 20 | Toner 20 | B | 14000 sheets | A | 55° C. | A | 155° C. |
| Example 21 | Toner 21 | B | 15000 sheets | A | 55° C. | A | 155° C. |
| Example 22 | Toner 22 | A | 16000 sheets | A | 55° C. | A | 155° C. |
| Example 23 | Toner 23 | A | 16000 sheets | A | 50° C. | A | 160° C. |
| Example 24 | Toner 24 | A | 16000 sheets | B | 45° C. | B | 165° C. |
| Comparative Example 1 | Comparative Toner 1 | A | 16000 sheets | C | 35° C. | C | 175° C. |
| Comparative Example 2 | Comparative Toner 2 | B | 15000 sheets | C | 35° C. | C | 175° C. |
| Comparative Example 3 | Comparative Toner 3 | A | 16000 sheets | C | 35° C. | B | 170° C. |
| Comparative Example 4 | Comparative Toner 4 | A | 16000 sheets | C | 30° C. | C | 175° C. |
| Comparative Example 5 | Comparative Toner 5 | A | 16000 sheets | C | 30° C. | C | 180° C. |
| Comparative Example 6 | Comparative Toner 6 | B | 15000 sheets | D | 25° C. | D | 185° C. |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-088586, filed May 31, 2022 which is hereby incorporated by reference herein in its entirety.

What is claimed is:

1. A toner comprising a toner particle, the toner particle comprising a toner core particle and a shell covering the toner core particle, wherein the shell comprises an organosilicon polymer, the shell encapsulates a domain of a release agent, and in cross-sectional observation of the toner particle by a transmission electron microscope, a ratio of domains of the release agent that are not in contact with the toner core particle to a total number of the observed domains of the release agent is 85% by number or more.

2. The toner according to claim 1, wherein the release agent is a hydrocarbon wax.

3. The toner according to claim 2, wherein with depth profile analysis of the toner particle using time-of-flight secondary ion mass spectrometry, a fragment ion peak corresponding to a structure represented by a formula (1) below is obtained within a range of a molecular weight of 400 to 600 in a region corresponding to the domain of the release agent:

(1)

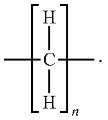

4. The toner according to claim 1, wherein in cross-sectional observation of the toner particle by a transmission electron microscope, an average value of a minimum distance D from a surface of the toner particle to the domain of the release agent is 5 to 50 nm.

5. The toner according to claim 1, wherein in cross-sectional observation of the toner particle by a transmission electron microscope, a ratio (S2/S1×100) of a total area S2 of the domains of the release agent to an area S1 occupied by the toner core particle is 0.05 to 5.5% by area.

6. The toner according to claim 1, wherein an area ratio of the organosilicon polymer on a surface of the toner particle is 35 to 75% by area.

7. The toner according to claim 1, wherein the organosilicon polymer is a condensation polymer of at least one compound selected from the group consisting of an organosilicon compound represented by a following formula (2), an organosilicon compound represented by a following formula (3), and an organosilicon compound represented by a following formula (4):

(2)

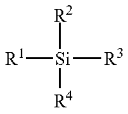

(3)

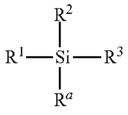

(4)

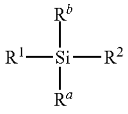

(In the formulas (2), (3) and (4), $R^a$ and $R^b$ are each independently an alkyl group having 1 to 8 carbon atoms, an alkenyl group having 1 to 8 carbon atoms, or a phenyl group, $R^1$, $R^2$, $R^3$ and $R^4$ each independently represent a halogen atom or an alkoxy group having 1 to 8 carbon atoms).

8. The toner according to claim 1, wherein the shell is the organosilicon polymer encapsulating the domains of the release agent.

* * * * *